(12) United States Patent
Slattery

(10) Patent No.: US 7,381,446 B2
(45) Date of Patent: Jun. 3, 2008

(54) SPRAYED PREFORMS TO FORMING STRUCTURAL MEMBERS

(75) Inventor: Kevin T. Slattery, St. Charles, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/533,583

(22) Filed: Sep. 20, 2006

(65) Prior Publication Data

US 2007/0014983 A1    Jan. 18, 2007

Related U.S. Application Data

(62) Division of application No. 10/689,237, filed on Oct. 20, 2003, now Pat. No. 7,128,948.

(51) Int. Cl.
*B05D 1/12* (2006.01)
*B05D 3/04* (2006.01)
*B05D 3/12* (2006.01)

(52) U.S. Cl. ............... 427/350; 427/180; 427/255.25; 427/255.4; 427/355

(58) Field of Classification Search ............ None
See application file for complete search history.

(56) References Cited

U.S. PATENT DOCUMENTS

| | | | |
|---|---|---|---|
| 5,070,228 A | 12/1991 | Siemers et al. | |
| 5,248,077 A | 9/1993 | Rhoades et al. | |
| 5,302,414 A | 4/1994 | Alkhimov et al. | |
| 5,366,344 A | 11/1994 | Gillbanks et al. | |
| 5,405,389 A | 4/1995 | Conta et al. | |
| 5,486,262 A | 1/1996 | Searle | |
| 5,682,677 A | 11/1997 | Mahoney | |
| 5,697,544 A | 12/1997 | Wykes | |
| 5,718,366 A | 2/1998 | Colligan | |
| 5,718,863 A | 2/1998 | McHugh et al. | |

(Continued)

FOREIGN PATENT DOCUMENTS

EP    1048390 A2    11/2000

(Continued)

OTHER PUBLICATIONS

Website of TWI Technology at http://www.twi.co.uk/techfile/tf-fricli.html; 1 page dated Dec. 8, 2000.

(Continued)

*Primary Examiner*—John J. Zimmerman
*Assistant Examiner*—Jason L Savage
(74) *Attorney, Agent, or Firm*—Alston & Bird LLP

(57) ABSTRACT

A preform and method for forming preforms and structural members are provided. The preform can be formed by cold spraying a structural material onto a base member, such that the preform has dimensions approximating the dimensions of the machined structural member to thereby reduce material waste and machining time when forming the structural member from the preform. In addition, the preforms can be plastically deformed to more closely correspond with the desired dimensions of the structural member. Further, hydrogen can be provided in a mixed stream of gas and structural material for spraying, and the resulting structural member can be subjected to a sub-atmospheric pressure to release hydrogen therefrom.

14 Claims, 7 Drawing Sheets

U.S. PATENT DOCUMENTS

| | | | |
|---|---|---|---|
| 5,769,306 | A | 6/1998 | Colligan |
| 5,794,835 | A | 8/1998 | Colligan et al. |
| 5,865,364 | A | 2/1999 | Trask et al. |
| 5,971,247 | A | 10/1999 | Gentry |
| 6,050,474 | A | 4/2000 | Aota et al. |
| 6,068,178 | A | 5/2000 | Michisaka |
| 6,070,784 | A | 6/2000 | Holt et al. |
| 6,095,402 | A | 8/2000 | Brownell et al. |
| 6,106,233 | A | 8/2000 | Walker et al. |
| 6,168,066 | B1 | 1/2001 | Arbegast |
| 6,173,880 | B1 | 1/2001 | Ding et al. |
| 6,216,765 | B1 | 4/2001 | Tseng et al. |
| 6,257,309 | B1 | 7/2001 | Kinane et al. |
| 6,548,183 | B2 | 4/2003 | Kobayashi et al. |
| 6,602,545 | B1 | 8/2003 | Shaikh et al. |
| 6,715,640 | B2 | 4/2004 | Tapphorn et al. |
| 6,905,725 | B2 | 6/2005 | Dykhne et al. |
| 6,915,964 | B2 | 7/2005 | Tapphorn et al. |
| 2002/0168466 | A1 | 11/2002 | Tapphorn et al. |

FOREIGN PATENT DOCUMENTS

| | | | |
|---|---|---|---|
| EP | 1057572 | A2 | 12/2000 |

OTHER PUBLICATIONS

Website of TWI Technology at http://www.twi.co.uk/connect/may00/c1063.html; 3 pages dated Dec. 8, 2000.

Website of University of Southhampton, Faculty of Mathematical Studies at http://www.maths.soton.ac.uk/esgi98/problems/rolls.html; 1 page dated Dec. 8, 2000.

Website of MTS Systems Corporation at http://www.mts.com/aesd/AdvanMan.htm; 2 pages dated Dec. 8, 2000 (Copyright 2000).

Website of MTS Systems Corporation at http://www.mts.com/aesd/aerospace_engine.htm; 1 page dated Nov. 13, 2000 (Copyright 2000).

Website of Inside Communications Limited at http://www.insidecom.co.uk/pwe/editorial/pwe352.htm; 2 pages dated Nov. 13, 2000.

Advanced Materials & Processes Feb. 1991; Tech Spotlight, Linear friction welding joins noncircular sections; p. 47.

Ralph M. Tapphorn and Howard Gabel; The Solid-State Spray Forming of Low-Oxide Titanium Components; Office of Industrial Technologies, Energy Efficiency and Renewable Energy, U.S. Department of Energy; Sep. 1998; pp. 45-47.

D.L. Hollar, Jr.; Resistance Seam Welding of Thin Copper Foils; Welding Journal; Jun. 1993; pp. 37-40.

SPRAYED PREFORMS TO FORMING STRUCTURAL MEMBERS

CROSS REFERENCE TO RELATED APPLICATIONS

This application is a divisional of U.S. application Ser. No. 10/689,237, filed Oct. 20, 2003, now U.S. Pat. No. 7,128,948 which is hereby incorporated herein in its entirety by reference.

FIELD OF THE INVENTION

This invention relates to preforms for use in forming machined structural members and, more specifically, to cold spraying of a structural material to form such preforms and structural members.

BACKGROUND OF THE INVENTION

Hogout machining generally refers to a process of forming a structural member by removing excess material from a piece of stock material, such as a plate or block, to arrive at the desired configuration and dimensions for the member. Oftentimes when practicing hogout machining, the dimensions and configuration of the structural member are such that appreciable amounts of material must be removed. Thus, while hogout machining provides a method for forming structural members having complex configurations, hogout machining can be costly due to the relatively large amount of excess material or scrap that typically must be removed and because the machining process can be time consuming and labor intensive. Hogout machining also can cause excessive wear on the cutting machine and tools, which can result in machine downtime and/or tool breakage that in turn can adversely affect the tolerances of the finished structural member. In addition, the availability of stock sizes of material limits the overall dimensions of a structural member formed by hogout machining.

In order to reduce material waste and machining times, other methods are used for forming the stock material to be used in machining a structural member. For example, one method is machined forging, which refers to the process of machining a part from a piece of forged stock material that approximates the final configuration. When machined forging is used, the amount of machining can be reduced because the forged stock material is first hand or die forged to dimensions that more closely approximate the desired dimensions of the finished member. However, the production of forged stock material can be time consuming and labor intensive and, in the case of die forgings, can require the production of costly forging dies. Die forgings can require ultrasonic inspection, as the forging process can cause internal cracks or other defects, especially when extreme deformation of the stock material is required. Additionally, both die and hand forging can cause residual stresses in the forged stock material that can remain in the finished structural member. Residual stresses can necessitate slower cutting speeds when hogout machining and can adversely affect the material properties and tolerances of the finished structural member.

Alternatively, a near-net shape can be formed by a variety of spraying processes in which particles are mixed with a gas and sprayed onto a surface of a substrate. For example, cold spraying generally refers to a process in which the particles and the gas are maintained at a temperature below the melting point of the particles. Cold spraying, which is further described in U.S. Pat. No. 5,302,414 to Alkhimov, et al. and U.S. Application No. 2002/0168466 A1 to Tapphorn, et al., can be used to deposit the particles onto the substrate to form a coating on the substrate. However, the deposition of the particles onto the substrate can be difficult to control, and certain detailed and/or complex configurations can be difficult to form by cold spraying. Further, the gas used for cold spraying can become trapped in the deposited material, thereby affecting the ductility or other properties of the material, as can occur, for example, if nitrogen is used to deposit titanium.

Thus, there remains a need for improved methods of forming stock material or "preforms" for use in forming machined structural members. Such preforms should approximate the desired dimensions and configuration of the structural member to reduce the machining time required during machining, as well as reduce waste material. The desired dimensions and configuration of the structural member should not be limited by the sizes of available stock materials. In addition, such preforms should have negligible residual stresses so that the finished machined member will have consistent material properties and dimensional tolerances.

SUMMARY OF THE INVENTION

The present invention provides an improved preform and associated methods for forming preforms and structural members. The preform can be formed by cold spraying a structural material onto a base member, such that the preform has dimensions approximating the dimensions of the machined structural member to thereby reduce material waste and machining time when forming the machined structural member from the preform. Advantageously, the methods of the present invention can be adapted for forming preforms and structural members of any size and configuration. Further, the preform and/or the structural member can be processed to achieve the desired material properties and dimensional tolerances.

According to one embodiment, the present invention provides a method of forming a preform for use in forming a structural member. The method includes determining desired dimensions of the structural member and providing a base member according to the desired dimensions of the structural member. Particles of the structural material are sprayed on the base member so that the structural material is disposed on the base member to form the preform. The base can become part of the preform, or the base can be a mold onto which the structural material is disposed, and then from which the structural material is removed. A cold spraying process can be used, in which a mixed stream of gas and particles of the structural material is directed toward the base member so that the structural material is deposited on the base member. The preform is then plastically deformed according to the desired dimensions of the structural member so that the preform has dimensions approximating the desired dimensions of the structural member. For example, the preform can be hot or cold forged using one or more dies. In addition, the grain size of the preform can be refined as a result of the plastic deformation. The preform can also be processed with a material treatment such as hot isostatic pressing, heat-treating, aging, quenching, stretching, annealing, and solution annealing. The present invention also provides a method of forming a structural member by machining the preform to remove excess material and thereby achieving the desired dimensions of the structural member.

According to another embodiment, the present invention provides a method of forming a structural member. The method includes introducing particles of a structural material, such as titanium, into a gas comprising hydrogen, and mixing the gas and particles to form a mixed stream having a temperature sufficiently low to prevent melting of the structural material. The mixed stream of the gas and particles is directed toward a base member so that the structural material is deposited on the base member, thereby forming the structural member. Subsequently, the structural member is subjected to a sub-atmospheric pressure, e.g., a pressure less than about 0.0001 torr for at least about 60 minutes, thereby releasing hydrogen from the structural material of the structural member. Typically, the structural member is also heated in conjunction with being subjected to the sub-atmospheric pressure. According to another aspect, the structural member is machined to predetermined dimensions, either before or after the structural member is subjected to the sub-atmospheric pressure.

Further, the present invention provides a preform for use in forming a machined structural member of predetermined dimensions. The preform includes a base member and a structural material deposited on the base member by cold spraying, such that the structural material contains hydrogen gas. Each of the base member and the structural material define at least one machinable portion configured to be machined to define the predetermined dimensions. The base member or the structural material can be formed of materials such as aluminum, aluminum alloys, titanium, titanium alloys, nickel-based alloys, steel, copper-based alloys, and beryllium-based alloys. Further, the base member and the structural material can be formed of similar or dissimilar materials.

Accordingly, the present invention provides a preform and methods for forming preforms and structural members having dimensions approximating the desired dimensions of the structural member to thereby reduce material waste and machining time. Advantageously, the preforms and methods of the present invention facilitate the efficient production of machined structural assemblies having consistent material properties and dimensional tolerances. Further, preforms can be formed according to the present invention such that subsequent die forging can be performed at a reduced pressure, thereby requiring a press with a lower capacity and reducing the temperature and cost of the die forging operation. In addition, the shearing that occurs in plastic deformation can break up any surface oxides and improve bonding between the original particles of the structural material.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
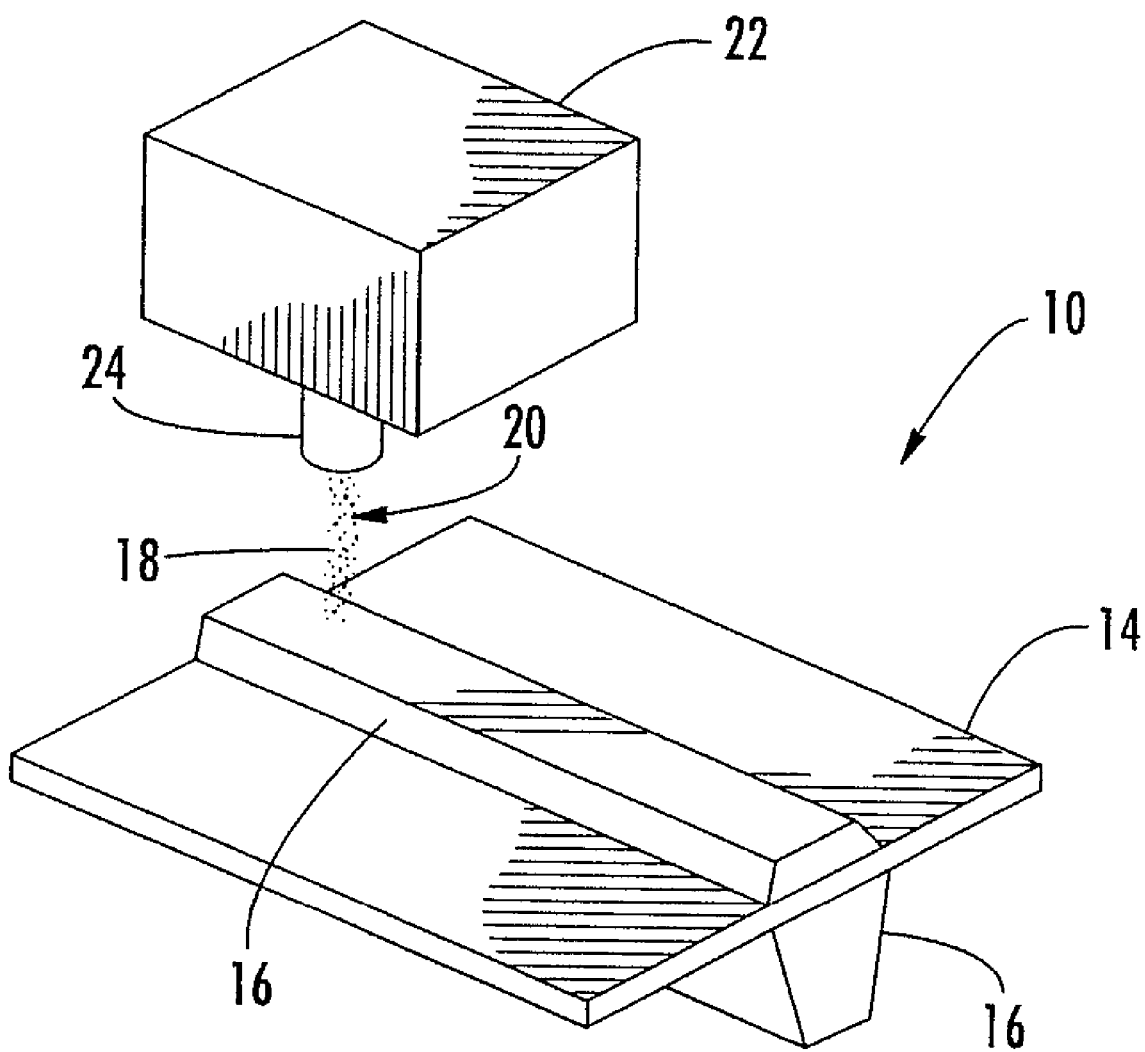
FIG. 1 is perspective view illustrating a base member and a structural material partially disposed thereon during the process of forming a preform according to one embodiment of the present invention.
Figure 2:
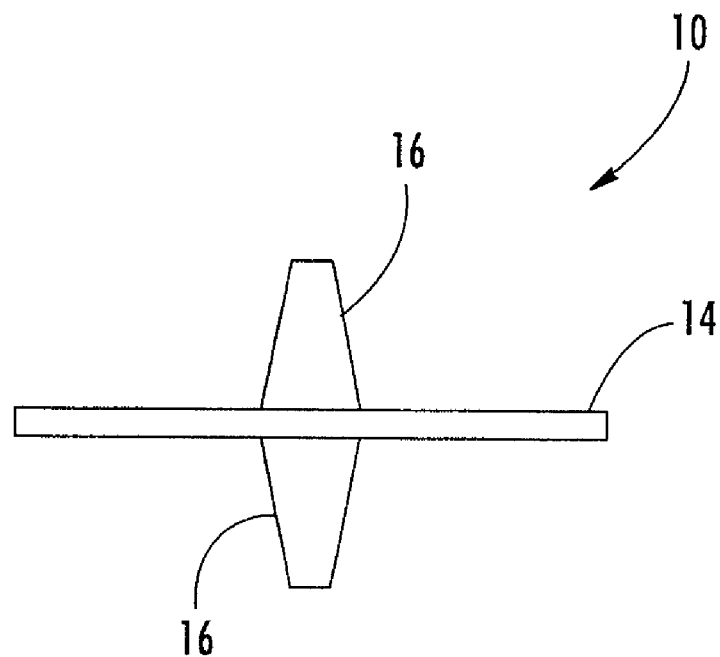
FIG. 2 is an elevation view illustrating a preform formed from the base member and structural material illustrated in FIG. 1.
Figure 3:
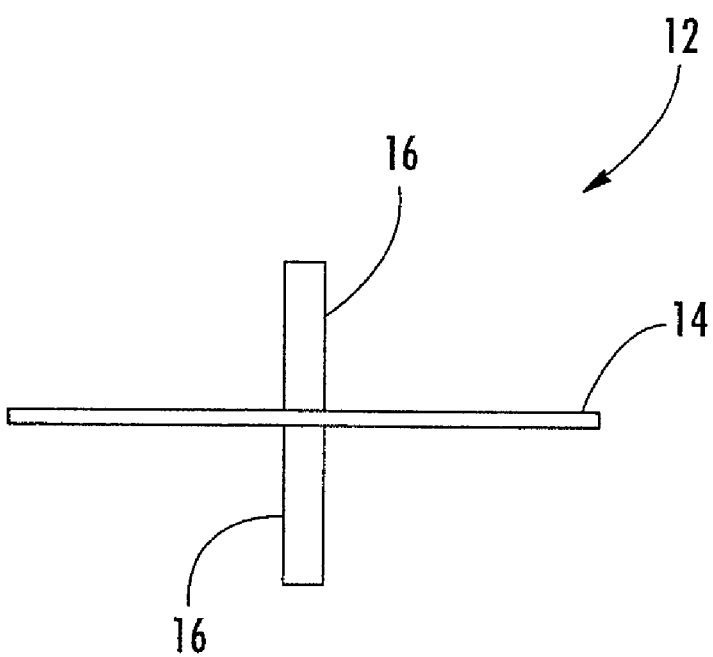
FIG. 3 is an elevation view illustrating a structural member formed from the preform of FIG. 2 according to one embodiment of the present invention.

Referring to the drawings and, in particular, to FIGS. 1-3, there is illustrated the construction of a preform 10 (FIG. 2) and a structural member 12 (FIG. 3), according to one embodiment of the present invention. The term "preform" generally refers to a member or assembly of members that can be further formed or processed to form a member of desired configuration and dimensions. "Structural member" generally refers to a member having desired configuration and dimensions. However, it is understood that preforms can be employed without further forming or processing, and structural members can be formed or processed additionally.

As illustrated in FIG. 1, the preform 10 is formed from a base member 14 and a structural material 16 disposed thereon. The term "base member" is not meant to be limited to any particular type or configuration of member. For example, the base member 14 can be a planar plate or sheet, as illustrated in FIG. 1. Alternatively, the base member 14 can have other configurations, including, for purposes of example only and not limitation, blocks having rectangular or square cross-sections, tubes, cylinders, angles, channels, irregular geometric configurations, and the like. The base member 14 can be formed from a variety of fabricating processes, as is known in the art, including milling, casting, or forging. Further, the base member 14 can be an assembly that is formed by joining multiple members.

The size and configuration of the base member 14 can be selected according to the desired size and configuration of the structural member 12 that is to be formed, e.g., according to predetermined or desired dimensions of the structural member 12 that are achieved by machining the preform 10. More specifically, the desired dimensions of the machined structural member 12 are determined and then the base member 14 is selected so that the resulting preform 10 will closely approximate the desired dimensions and configuration of the finished structural member 12. Advantageously, by forming preforms 10 having dimensions and configurations closely or substantially approximating the desired dimensions and configuration of the corresponding structural member 12, the preforms 10 can subsequently be machined to the dimensions of the structural member 12 with a reduced amount of machining. Thus, a reduction in machining time and material waste can be achieved, thereby making these structural members 12 more economical to produce. One measure of wasted material in a machining process is the buy:fly ratio, which compares the mass of the block of material that is to be machined to the mass of the finished machined component. Hogout machining typically results in a buy: fly ratio of between about 10:1 and 50:1. Thus, between about 90% and 98% of the mass of a conventional block of stock material is typically removed when hogout machining is used. Buy:fly ratios for machined structural members formed according to the present invention vary, but are typically between about 1:1 and 10:1 and, more typically, between about 2:1 and 6:1.

The material composition of the base member 14 and the structural material 16 can be selected according to the specifications and design requirements of the structural member 12. For example, each of the base member 14 and the structural material 16 can be formed of materials having high strength to weight ratios and good corrosion resistance. For purposes of example only and not limitation, the base member 14 and the structural material 16 can include aluminum, aluminum alloys, titanium, titanium alloys, steel, nickel-based alloys, copper-based alloys, or beryllium-based alloys. The base member 14 and the structural material 16 can be formed from the same, similar, or dissimilar materials.

The structural material 16 is deposited onto the base member 14, e.g., by cold spraying. In particular, the structural material 16 can be provided as particles 18 that are mixed with a gas and accelerated to form a mixed stream 20. The mixed stream 20 is then directed toward the base member 14 so that the particles 18 of the structural material 16 impinge upon the base member 14 and are bonded thereto in a desired configuration on the base member 14. As shown in FIG. 1, a spraying apparatus 22 is configured to provide the mixed stream 20, including the gas and the particles 18 of the structural material 16. The mixed stream 20 is directed through a nozzle 24 toward a portion of the base member 14 onto which it is desired to dispose the structural material 16. The relative position of the nozzle 24 and the base member 14 can be adjusted during the spraying operation so that the spraying apparatus 22 disposes the structural material 16 onto the base member 14 to form features according to the predetermined dimensions of the structural member 12. The gas and, hence, the particles 18 of the structural material 16 can be directed through the nozzle 24 and toward the base member 14 at a variety of speeds. For example, in some embodiments of the invention, the gas flows at a speed of between about 300 and 1300 meters/second. Thus, the gas can flow at a subsonic speed, sonic speed, or supersonic speed. It is appreciated that the nozzle 24 can define converging and/or diverging portions, and that the desired speed of the mixed stream 20 can be achieved by adjusting the size or configuration of the nozzle 24 or by adjusting the pressure of the gas delivered to the spraying apparatus 22.

The term "cold spraying" generally refers to an operation in which the particles 18 and/or the gas are disposed without heating or, more typically, heated to a temperature that is below the melting temperature of the structural material 16 so that the particles 18 are softened but do not generally melt. For example, according to one embodiment of the present invention, the gas is heated to a temperature of about 750° F., before or after the particles 18 of titanium or titanium alloys are introduced to the gas such that the particles 18 are also heated. In this regard, the spraying apparatus 22 can include a heater (not shown) for heating the gas and/or the particles 18 to facilitate plastic deformation of the particles 18 upon impacting the base member 14. In either case, as the particles 18 impact upon the base member 14, the particles 18 of the structural material 16 deform, at least partially flattening against the base member 14 and sticking to the base member 14.

The operational characteristics of the cold spraying process can be selected or adjusted according to the particular spraying process to be performed. In particular, such adjustable operational characteristics include the type and flow rate of the gas; the amount of the structural material 16 provided in the mixed stream 20; the speed and temperature of the mixed stream 20; the size, profile, and configuration of the nozzle 24; the preparation of the surfaces of the base member 14; the relative position and motion of the spraying apparatus 22 and the base member 14; and the like. These and other operational characteristics of the cold spraying process can be adjusted according to such factors as the type of material of the base member 14 and the structural material 16; the size of the particles 18 of the structural material 16; the desired amount and configuration of the structural material 16 to be deposited on the base member 14; other operational characteristics of the cold spraying process; and the like. For example, if the structural material 16 has a relatively high melting temperature, the temperature of the gas can be increased so that the particles 18 of the structural material 16 are sufficiently deformed upon impact with the base member 14 and bonded thereto. Similarly, for relatively larger sized particles 18 of the structural material 16, the speed of the mixed stream 20 or the temperature of the structural material 16 and the gas can be increased. Further, the amount of the structural material 16 provided in the mixed stream 20 can be increased to deposit an increased amount of the structural material 16 on the base member 14. Similarly, the motion of the spraying apparatus 22 relative to the base member 14 can be decreased so that the nozzle 24 directs more of the structural material 16 onto any particular portion of the base member 14, thereby increasing the amount of structural material 16 disposed on that portion of the base member 14.

A variety of gases can be used for forming the mixed stream 20 and propelling the particles 18 of the structural material 16 toward the base member 14. For example, inert gases such as nitrogen, helium, or argon can be accelerated and mixed with the structural material 16 in the spraying apparatus 22 such that the stream 20 is emitted from the nozzle 24 of the apparatus 22 as a mixture of the particles 18 and the inert gas. Alternatively, the gas used for forming the mixed stream 20 and depositing the structural material 16 on the base member 14 can include hydrogen. For example, the gas can be pure hydrogen, hydrogen with trace amounts of other gases, or a mixture of hydrogen and one or more additional gases such as nitrogen.

In one advantageous embodiment of the present invention, the gas contains hydrogen, and the particles 18 of the structural material 16 are formed of titanium or titanium alloys. During the deposition of the structural material 16 on the base member 14, small amounts of the hydrogen gas are trapped in pockets, bubbles, gaps, or other voids formed within the titanium. Subsequently, the preform 10, or the structural member 12 formed therefrom, can be processed in a vacuum furnace, in which the structural member 12 is heated and subjected to a sub-atmospheric pressure, i.e., a vacuum annealing operation. For example, the preform 10 or the structural member 12 can be inserted in a vacuum furnace in which a pressure of less than about 0.0001 torr is provided and subjected to the sub-atmospheric pressure for at least about 60 minutes while heated. In some embodiments, the pressure can be less than 0.00001 torr, and the preform 10 or structural member 12 can be subjected to the sub-atmospheric pressure for more than two hours or more than four hours. It is appreciated that other gases that are used for delivering the particles 18 of the structural material 16 can also be removed from the preform 10 or structural member 12, especially where the gas is soluble in the structural material 16 and non-reactive with the structural material 16.

Cold spraying of the structural material 16 can be used to form a variety of shapes including features such as flanges, ridges, or posts that extend from a surface of the base member 14. Preferably, the structural material 16 is disposed onto the base member 14 according to the desired dimensions of the structural member 12, i.e., the structural material 12 (with or without the base member 14) forms the preform 10, which has dimensions approximating the desired dimensions of the structural member 12 so that the structural member 12 can be formed from the preform 10 without excessive machining.

As illustrated in FIGS. 2 and 3, once the preform 10 is formed, a predetermined amount of excess material can be machined from the preform 10 to form the machined structural assembly 12. The machining process can be performed by any known means, including using a manual or computer-guided machining device, such as a computer numeric control (CNC) machine. The excess material can be removed from some or all of the exposed surfaces of the structural material 16 and the base member 14. Advantageously, because the preforms 10 closely or substantially approximate the desired dimensions and configuration of the corresponding machined structural member 12, the amount of machining is relatively less than, for example, the amount of machining that would be required to machine hogout structural members from solid rectangular blocks of material.

Figure 4:
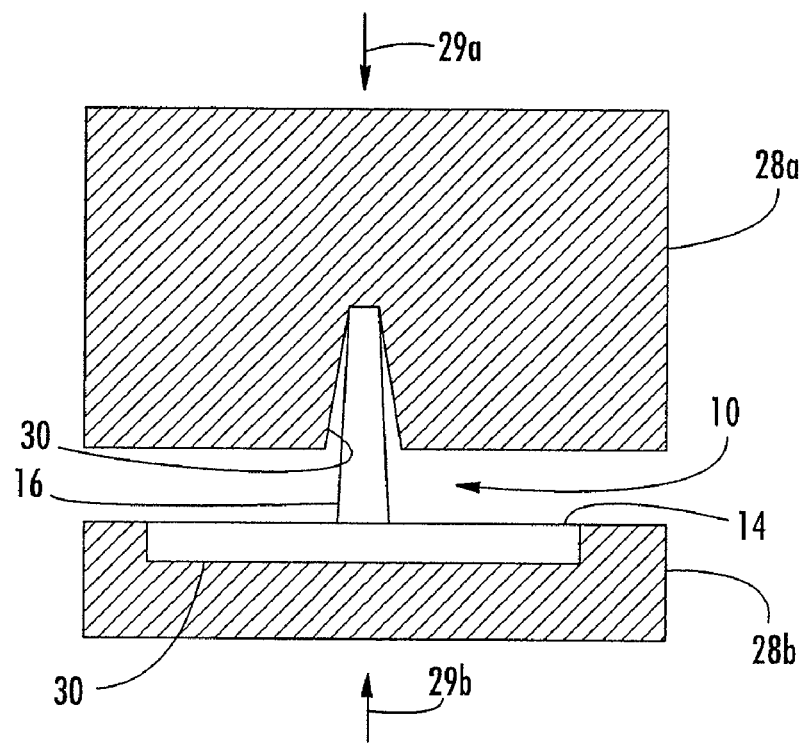
FIG. 4 is an elevation view illustrating a preform configured to be die forged according to another embodiment of the present invention.
Figure 5:
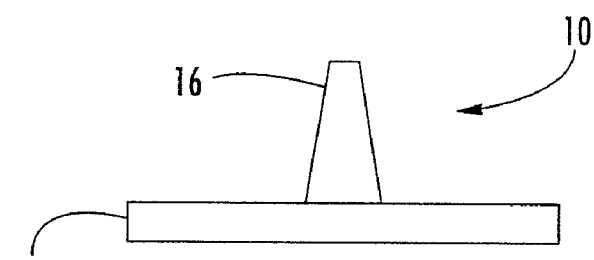
FIG. 5 is an elevation view illustrating the preform of FIG. 4 after a forging operation according to one embodiment of the present invention.

Further, the preform 10 can be otherwise shaped to more closely correspond to the desired dimensions of the structural member 12. In particular, the preform 10 can be plastically deformed after the structural material 16 is deposited, e.g., by forging, bending, or otherwise working or re-shaping the preform 10. Forging of the preform 10 can be performed while the preform 10 is relatively hot or cold, i.e., hot forging or cold forging. For example, FIG. 4 illustrates a preform 10 having structural material 16 deposited to form a relatively slender elongate portion extending from the base member 14. The preform 10 can be heated to a temperature below its melting point and the preform 10 is disposed between opposing dies 28a, 28b. The dies 28a, 28b are urged inwardly in the directions 29a, 29b so that a forming surface 30 of each die 28a, 28b is urged against the preform 10 to form the preform 10 to the desired configuration. As shown in FIG. 5, the structural material 16 of the preform 10 has been deformed by the forging process to a less slender configuration. Thus, the structural material 16 can be deposited by spraying in a first configuration and subsequently deformed to a second configuration.

Figure 6:
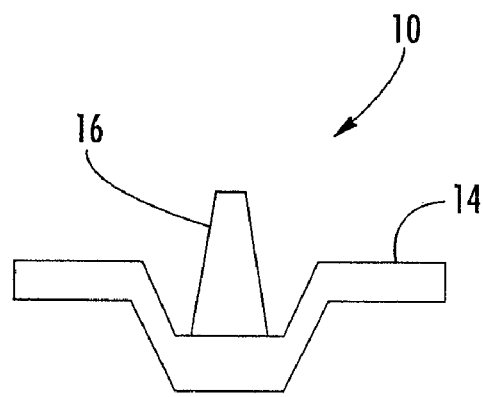
FIG. 6 is an elevation view illustrating the preform of FIG. 4 after a forging operation according to another embodiment of the present invention.

In other embodiments, the preform can be forged using a single die or more than two dies. Further, although the dies 28a, 28b shown in FIG. 4 define forming surfaces 30 that are concave and therefore define a die cavity that receives all or part of the preform 10, in other embodiments, the forming surfaces 30 of the die(s) can be convex in shape so that the dies form convex feature(s) on the preform 10 when urged thereagainst. In addition, the base member 14 can also be plastically deformed during the forging process. For example, the preform 10 shown in FIG. 6 can be formed by forging the preform 10 of FIG. 4 with one or more dies (not shown) that define the desired configuration of the base member 14.

Forging and other types of plastic deformation of the preform 10 can be used to form geometric configurations that are difficult to achieve directly by spraying. For example, elongate portions that extend from the base member 14, which can be difficult to form directly by spraying, can be formed by forging as described in connection with FIGS. 4 and 5. Thus, forging can change the configuration of the preform 10 to more closely correspond to the desired dimensions of the structural member 12. In addition, plastic deformation can provide mechanical working of the preform 10. In some cases, the plastic deformation of the preform 10, by die forging or otherwise, can refine the grain size of the preform 10, thereby resulting in improved material characteristics of the preform 10 and, hence, the structural member 12. Further, forging and other types of plastic deformation of the preform 10 can close gaps, holes, bubbles, or discontinuities in the preform 10. In this regard, forging can be easier and cheaper to perform than other consolidation processes such as HIP. Advantageously, the preform 10 and/or the structural member 12 can be forged in a vacuum or partial vacuum, so that the resulting porosity of the structural member 12 is reduced, e.g., by releasing gas from the structural material 16 that was previously introduced during the cold spraying process. Alternatively, the forging process can be performed in an environment of hydrogen gas, and the preform 10 or structural member 12 can be subsequently subjected to a vacuum annealing operation to remove the hydrogen therefrom, as described above.

If the preform 10 is to be plastically deformed, the plastic deformation is typically performed before the preform 10 is machined, though in some cases, the preform 10 can be machined before being plastically deformed, in addition or instead of machining after deformation. Thus, for example, the preforms 10 shown in FIGS. 5 and 6 can be machined to form structural members having desired dimensions. However, in some embodiments, plastically deforming and/or machining of the structural member may not be required, and the structural member can be formed without performing one or both of those operations.

Figure 7:
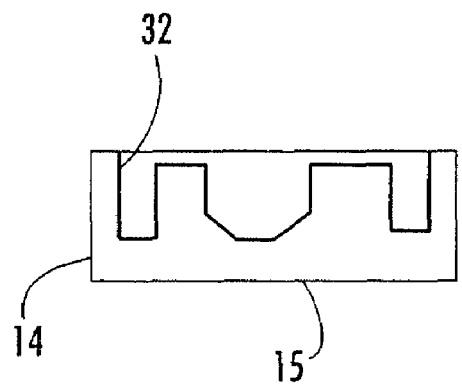
FIG. 7 is an elevation view illustrating a mold for use as a base member according to another embodiment of the present invention.
Figure 8:
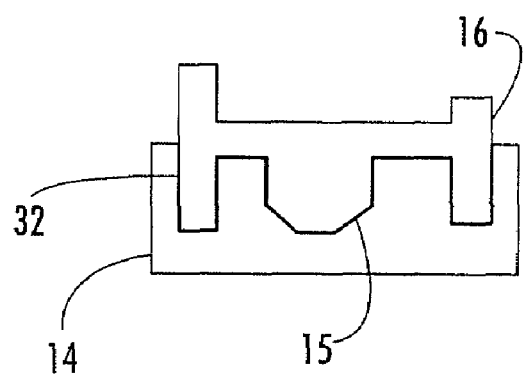
FIG. 8 is an elevation view illustrating the mold of FIG. 7 with a structural material disposed thereon to form a preform according to one embodiment of the present invention.
Figure 9:
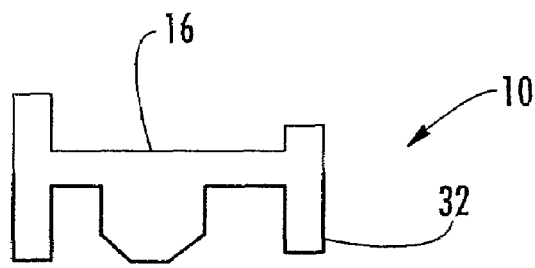
FIG. 9 is an elevation view illustrating the preform of FIG. 8.
Figure 10:
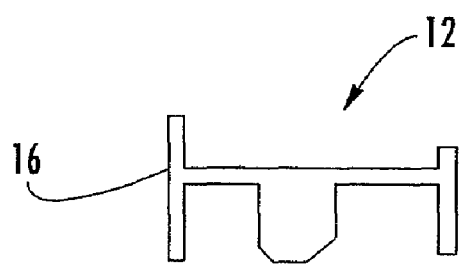
FIG. 10 is an elevation view illustrating a structural member formed from the preform of FIG. 8 according to one embodiment of the present invention.

In the foregoing examples, the preform 10 includes both the base member 14 and the structural material 16, but in other embodiments of the present invention the preform 10 can include the structural material 16 and not the base member 14. Accordingly, the structural member 12 can be formed by removing the structural material 16 from the base member 14 and machining or otherwise forming only the structural material 16. For example, as illustrated in FIGS. 7 and 8, the base member 14 can be a mold that defines a contoured surface 15 for receiving the structural material 16, the surface 15 corresponding to the desired shape of the preform 10 and/or the structural member 12. The contoured surface 15 can correspond to the desired configuration of the structural member 12 so that the preform 10 formed by the structural material 16 can be removed from the base member 14 and machined to form the structural member 12, as shown in FIGS. 9 and 10. Further, as described above, the preform 10 can be plastically deformed before or after machining. In some cases, a liner 32 can be provided over the contoured surface 15 so that the structural material 16 is disposed onto the liner 32. In particular, the liner 32 can be provided if the base member mold 14 is formed of a material onto which the structural material 16 cannot be easily deposited or from which the structural material 16 cannot be easily removed. For example, if the base member mold 14 is formed of ceramic, to which metallic structural materials do not easily adhere, the liner 32 can be provided over the contoured surface 15 of the base member mold 14. In particular, the liner 32 can be a relatively thin layer of copper onto which the structural material 16 is more easily deposited. The structural material 16 can be removed from the liner 32 after forming, or the liner 32 can be part of the preform 10 and/or structural member 12.

According to one embodiment of the present invention, the base member 14 is processed before cold spraying, after cold spraying, after plastic deformation, and/or after machining. For example, the surfaces of the base member 14 can be cleaned before cold spraying using a solvent or abrasive cleaner to remove any oxidation or surface defects so that a strong material bond can be obtained by cold spraying. Alternatively, the base member 14 can be cleaned by a pickling acid cleaning operation, in which the base member 14 is exposed to an acidic fluid. In other embodiments, the base member 14, preform 10, or structural member 12 can undergo a material treatment, such as hot isostatic pressing (HIP), heat treating, aging, quenching, stretching, annealing, or solution annealing, to obtain desired mechanical or chemical properties, as is known in the art. For example, HIP can be performed by subjecting the preform 10 or the structural member 12 to a pressure above 15,000 psi, or above 30,000 psi in some embodiments, and an elevated HIP temperature. For titanium, the HIP temperature is typically about 1650° F. For steel, the HIP temperature is typically about 2200° F. As a result of the HIP treatment, discontinuities in the preform can be removed, such as by consolidating the structural material 16 to reduce or eliminate bubbles, gaps, or other voids formed during cold spraying.

According to another embodiment of the present invention, the preform 10 is subjected to a sub-atmospheric pressure, i.e., a vacuum or partial vacuum, in order to remove inert gas, air, or other gas disposed within the structural material 16. The preform 10 can optionally be subjected to hydrogen gas thereafter so that the preform 10 absorbs some of the hydrogen. In either case, the preform 10 can be subsequently cold isostatic pressed to reduce a porosity of the preform 10. The cold isostatic press operation includes subjecting the preform 10 to an elevated pressure for a duration of time, e.g., a pressure of more than about 15,000 psi for about 30 minutes or more. Such cold isostatic pressing reduces the porosity of the preform 10 by reducing and/or closing pores in the preform 10, thereby densifying, i.e., increasing the density of, the preform 10.

Figure 11:
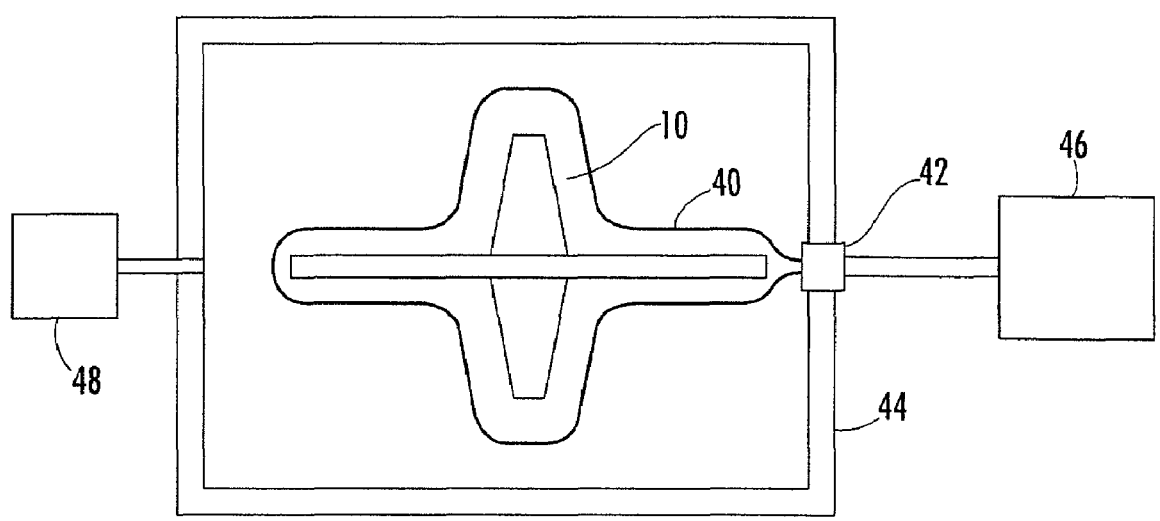
FIG. 11 is a section view illustrating a preform sealed in a membrane and disposed in a cold isostatic press according to another embodiment of the present invention.

The preform 10 can be substantially encapsulated in a membrane 40 before being cold isostatically pressed. For example, the preform 10 can be sealed in a laminar membrane 40 formed of plastic or rubber as shown in FIG. 11. A vent 42 can be provided in the membrane 40 for evacuating the membrane 40. For example, the vent 42 can be fluidly connected to a gas device 46 such as a pump for evacuating the membrane 40 or a gas source for providing hydrogen or other gases. Further, hydrogen can be delivered into the membrane 40 through the vent 42 thereafter so that the preform 10 absorbs hydrogen. The preform 10, with the membrane 40, can be disposed in a cold isostatic press 44 and pressed as described above, e.g., by pressurizing the press 40 with gas delivered by a gas source 48 such as a compressor or a pressurized vessel. Preferably, the cold isostatic pressing operation is performed at a temperature lower than a reaction temperature of the membrane 40 so that the preform 10 and the membrane 40 do not chemically react during the operation. In some cases, the cold isostatic press operation can be performed at between about 200° F. and 300° F. Thereafter, the membrane 40 can be removed from the preform 10 and discarded or reused. The preform 10 can be heated and subjected to a vacuum to remove hydrogen or other gases from the preform 10, and the preform 10 can be forged or otherwise processed and machined as described above. While the cold isostatic process is described as being performed on the preform 10, it is appreciated that the same operations can similarly be performed on the structural member 12 that is formed by machining the preform 10.

Figure 12:
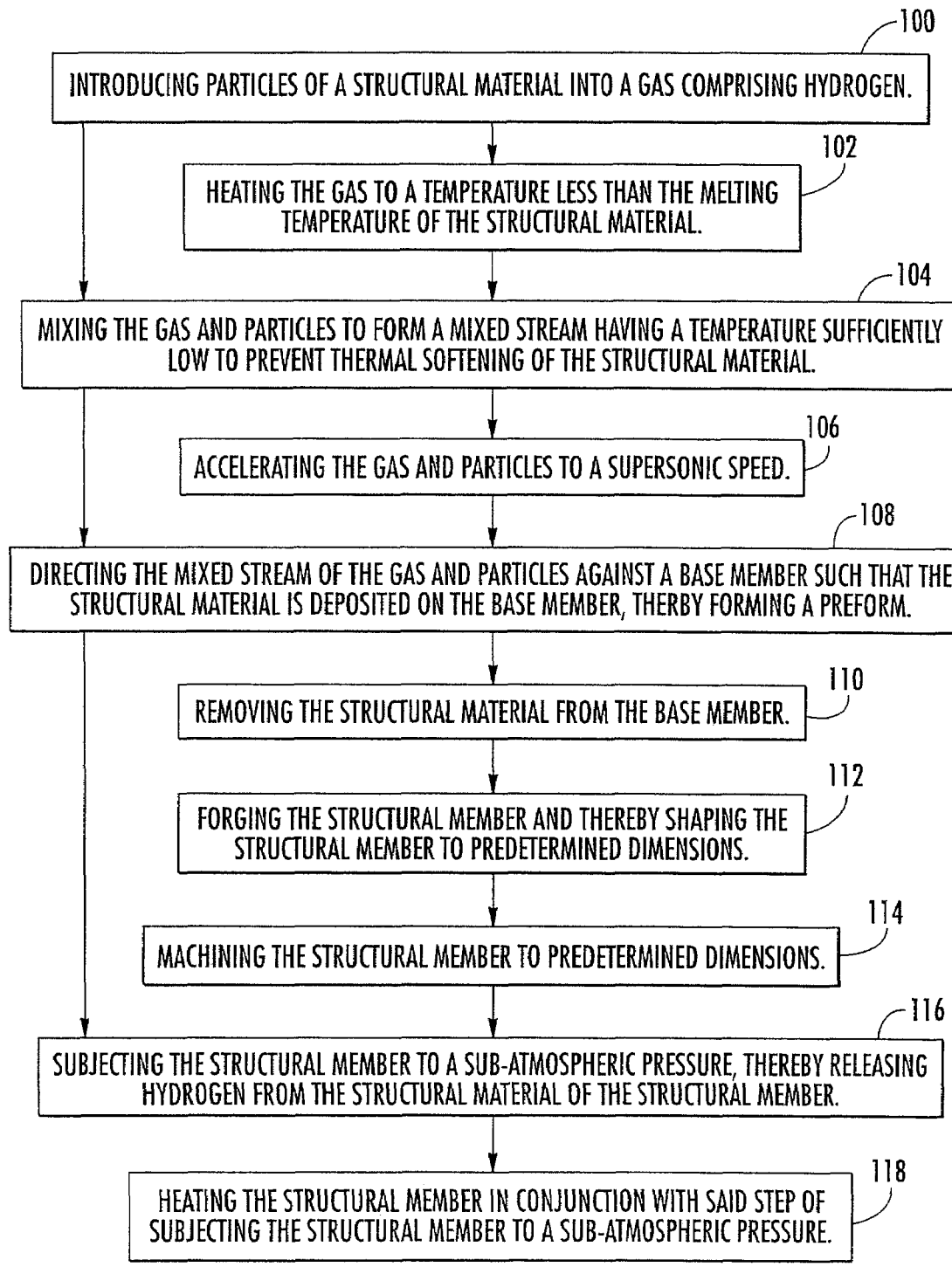
FIG. 12 is a flow chart illustrating a method for forming a preform, according to one embodiment of the present invention.

Referring to FIG. 12, there are illustrated the operations performed in forming a structural member according to one embodiment of the present invention. It is understood that some of the illustrated operations can be omitted, and/or additional operations can be performed, without departing from the scope of the present invention. As illustrated, the method includes introducing particles of a structural material into a gas comprising hydrogen. See Block 100. For example, either or both of the base member and the structural material can be formed of titanium or titanium alloys, and the particles can be between about 1 and 50 microns in diameter. The gas can be at least about 99% hydrogen by weight. In addition, the gas can be heated to a temperature less than the melting point of the structural material. See Block 102. The gas and particles are mixed to form a mixed stream having a temperature sufficiently low to prevent thermal softening or melting of the structural material. See Block 104. For example, the gas and particles can be accelerated to a supersonic speed. See Block 106. The mixed stream of the gas and particles is directed toward the base member so that the structural material is deposited on the base member, thereby forming a structural member. See Block 108. According to one embodiment of the present invention, the structural material can be removed from the base member, e.g., if the base member is a mold. See Block 110. It is understood that the structural member formed thereby can be further formed or processed, and the dimensions or configuration of the structural member can be changed as desired. For example, the structural member can be forged and thereby shaped to predetermined dimensions. See Block 112. In addition, or alternative, the structural member, including the base member and/or the structural material, can be machined to predetermined dimensions. See Block 114. Next, the structural member is subjected to a sub-atmospheric pressure, thereby releasing hydrogen from the structural material of the structural member. See Block 116. For example, the structural member can be heated and exposed to a pressure less than about 0.0001 torr for at least about 60 minutes. More particularly, structural members formed of titanium can be heated to a temperature of about 1400° F. and subjected to the vacuum for about 5 hours. Typically, the structural member is heated in conjunction with being subjected to the sub-atmospheric pressure. See Block 118.

Figure 13:
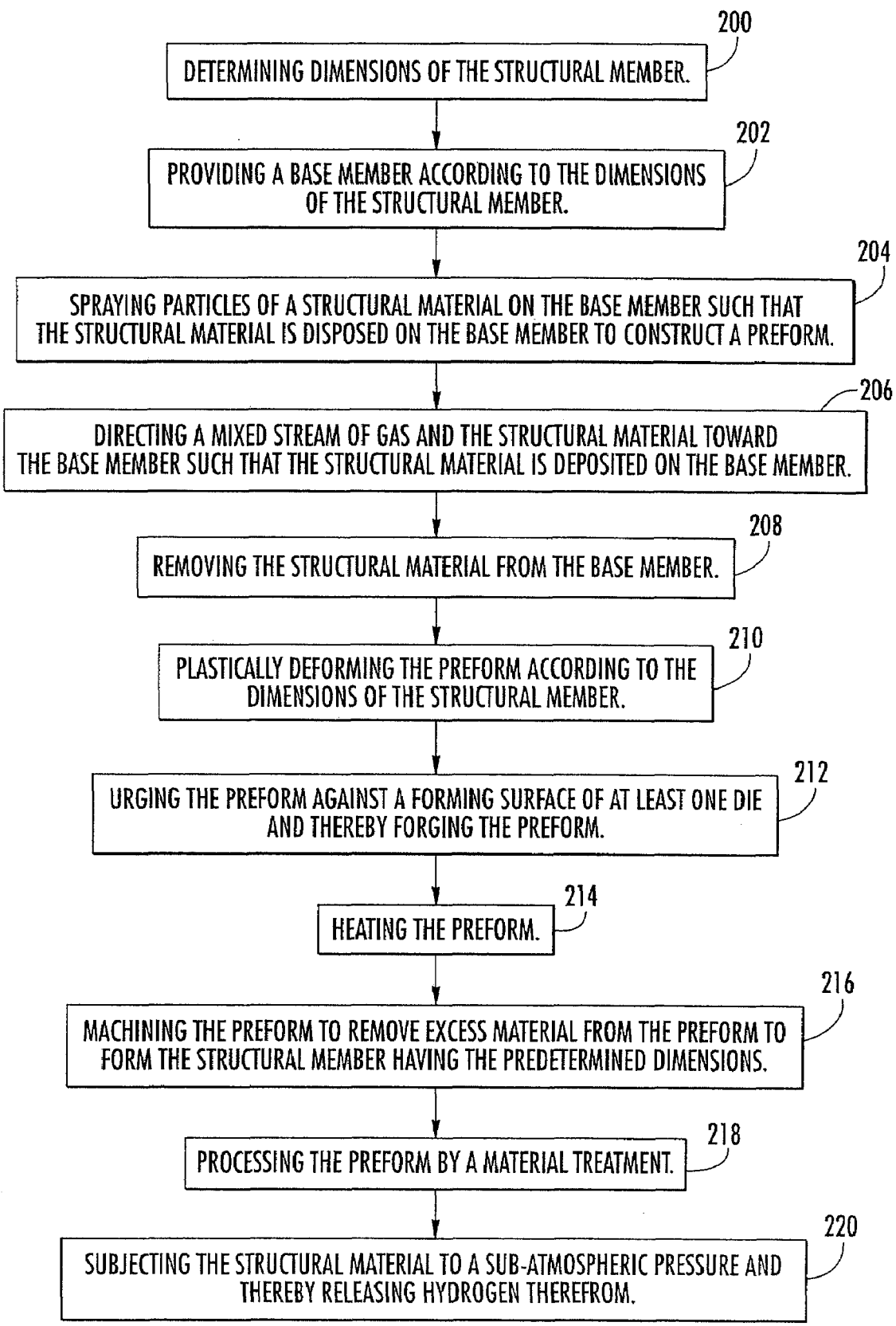
FIG. 13 is a flow chart illustrating a method for forming a machined structural assembly, according to one embodiment of the present invention.

FIG. 13 illustrates the operations performed in forming a preform and/or a structural member according to another embodiment of the present invention. As illustrated, the method includes determining desired dimensions of the structural member. See Block 200. A base member is provided according to the dimensions of the structural member. See Block 202. Particles of a structural material are sprayed on the base member so that the structural material is disposed on the base member to form a preform. See Block 204. For example, the base member and/or the particles can include titanium. A mixed stream of gas and the structural material is directed toward the base member so that the structural material is deposited on the base member. See Block 206. Preferably, the mixed stream has a temperature sufficiently low to prevent melting of the structural material. According to one aspect of the invention, the structural material is removed from the base member after the spraying step so that the structural material comprises the preform, e.g., where the base member is a mold. See Block 208. Next, the preform is plastically deformed according to the dimensions of the structural member so that the preform has dimensions approximating the dimensions of the structural member to thereby reduce material waste and machining time when forming the structural member from the preform. See Block 210. For example, the preform can be urged against a forming surface of at least one die to forge the preform. See Block 212. The preform can be heated. See Block 214. The base member and/or the structural material can be deformed, and in some cases the grain size of the preform is refined. The preform, including the base member and/or the structural material, is machined to remove excess material from the preform to form the machined structural member having the desired dimensions. See Block 216. The preform and/or the structural member can be processed by a material treatment such as hot isostatic pressing, heat-treating, aging, quenching, stretching, annealing, or solution annealing. See Block 218. Further, the gas in the mixed stream can include hydrogen, and the structural material can be subjected to a sub-atmospheric pressure, so that hydrogen is released therefrom. See Block 220.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming a structural member having predetermined dimensions, the method comprising:

introducing particles of a structural material into a gas comprising hydrogen;

mixing the gas and particles to form a mixed stream having a temperature less than a melting temperature of the structural material;

directing the mixed stream of the gas and particles toward a base member such that the structural material is deposited on the base member, thereby forming a structural member; and subjecting the structural member to a sub-atmospheric pressure, thereby releasing hydrogen from the structural material of the structural member.

2. A method according to claim 1 further comprising providing the particles of the structural material, the particles being between about 1 and 50 microns in diameter.

3. A method according to claim 1 further comprising heating the particles to a temperature less than the melting temperature of the structural material.

4. A method according to claim 1 further comprising providing the particles of the structural material, the particles comprising titanium.

5. A method according to claim 1 further comprising providing the base member and the particles of the structural material, each of the base member and the particles of the structural material comprising titanium.

6. A method according to claim 1 further comprising providing the gas, the gas comprising at least about 99% hydrogen by weight.

7. A method according to claim 1 wherein said mixing step comprises accelerating the gas and particles to a supersonic speed.

8. A method according to claim 1 wherein said step of subjecting the structural member to a sub-atmospheric pressure comprises subjecting the structural member to a pressure less than about 0.0001 torr.

9. A method according to claim 1 wherein said step of subjecting the structural member to a sub-atmospheric pressure comprises subjecting the structural member to the sub-atmospheric pressure for at least about 60 minutes.

10. A method according to claim 1 further comprising heating the structural member in conjunction with said step of subjecting the structural member to a sub-atmospheric pressure.

11. A method according to claim 1 further comprising removing the structural material from the base member.

12. A method according to claim 1 further comprising forging the structural member and thereby shaping the structural member to the predetermined dimensions.

13. A method according to claim 1 further comprising machining the structural member to the predetermined dimensions.

14. A method according to claim 1, further comprising:

prior to said directing step, determining desired dimensions of the structural member and providing the base member according to the determined dimensions of the structural member; and subsequent to said directing step, plastically deforming at least the base member and machining the structural member to remove excess material to thereby form the structural member having the predetermined desired dimensions, wherein said subjecting step comprises heating the structural member.

* * * * *